Oct. 3, 1961 J. KLINE 3,003,118

SYNCHRONIZED REGENERATIVE AMPLIFIER

Filed March 31, 1958 5 Sheets-Sheet 1

Jack Kline
*INVENTOR*

Jack Kline
INVENTOR

Jack Kline
*INVENTOR*

Jack Kline
*INVENTOR*

Jack Kline
*INVENTOR*

United States Patent Office 3,003,118

Patented Oct. 3, 1961

3,003,118

SYNCHRONIZED REGENERATIVE AMPLIFIER

Jack Kline, Concord, Mass., assignor to Sanders Associates, Inc., Nashua, N.H., a corporation of Delaware Filed Mar. 31, 1958, Ser. No. 725,383
11 Claims. (Cl. 331—55)

The present invention relates to high-frequency amplifiers. More particularly, the invention relates to high-frequency, power oscillators synchronized by a relatively low-power synchronizing source to provide effective amplification.

In applicant's co-pending application, Serial No. 617,116, filed October 19, 1956, entitled Coherent-Pulsed Oscillator, now Patent No. 2,901,707, a system is disclosed for injecting a low-power, synchronizing signal into a high-power, pulse oscillator to obtain pulse-to-pulse phase coherence. That device, however, is limited in application in that the synchronizing signal establishes control only over the starting phase of the energy in each pulse. As noted in that application, the high-power signal is not thereafter necessarily frequency locked to the synchronizing signal.

It is highly desirable to have a device for providing a high-power, high-frequency signal that can be frequency and phase locked to a relatively low-power synchronizing signal over a wide band of frequencies. A few prior art devices have been proposed as solutions to the problem of synchronizing such a high-power signal in phase and frequency to a relatively low-power synchronizing signal over a very narrow band of frequencies. Even in these few cases in the prior art where phase and frequency locking have been effectively accomplished, the power required from the synchronizing source is comparable to that controlled. No effective amplification was obtained in such devices.

It is particularly desirable to provide a relatively wide-band, magnetron-type amplifier. The basic simplicity of the magnetron oscillator is due to the cylindrical cathode and anode structure. It is extremely worthwhile to preserve this design for amplifier-type devices. In addition, the magnetron is inherently a very high-efficiency, high-frequency device, particularly at the so-called microwave frequencies, in the range from 1,000 to 35,000 megacycles.

In the X-band region, for example around 10,000 megacycles, the magnetron is capable of providing more than 500,000 watts, or one-half of a megawatt, of peak power. The magnetron is compact and relatively small. No other device is capable of providing so much power per unit of weight.

Other high-frequency devices such as the klystron and high-frequency triode are limited in their ability to handle a relatively broad range of frequencies. In the case of the klystron, for example, the extreme measures of cascading a plurality of resonant cavities have been taken to obtain high-gain amplification. In order to obtain wide-band operation, the cavities have been stagger-tuned. While such a device tends to overcome the problem of narrow-band frequency of operation, it is clear that the increased complexity, size, weight, and the degrading of gain and efficiency that results, is severely limiting for practical applications.

It is, therefore, an object of the present invention to provide an improved, synchronized, regenerative amplifier.

A further object of the invention is to provide an improved, synchronized, regenerative amplifier characterized by a high degree of amplification and operable at relatively high microwave frequencies.

Another object of the invention is to provide a synchronized, regenerative amplifier operable over a broad range of frequencies.

Yet another object of the invention is to provide an improved synchronized, regenerative magnetron amplifier.

A still further object of the invention is to provide an improved, synchronized, regenerative, magnetron amplifier, characterized by a high degree of amplification and operable over a broad range of frequencies.

Still another object of the invention is to provide an improved, synchronized, regenerative klystron amplifier, characterized by a high degree of amplification and operable over a broad range of frequencies.

In accordance with the invention, there is provided a synchronized, regenerative amplifier. The amplifier comprises an oscillator means for generating a relatively high-power, radio frequency signal and a loading means providing an output load for the oscillator means. The loading means is so coupled to the oscillator means as to tend to maintain it quiescent. A synchronizing generator means is included for providing a relatively low, synchronizing signal to enable the oscillator means to generate the high-power signal, which is then phase and frequency locked to the synchronizing signal. A non-reciprocal, directional coupling means is provided for coupling energy from the synchronizing means to the oscillator and from the oscillator means to the loading means. The coupling means translates substantially all of the energy from the synchronizing means only to the oscillator means and substantially all of the energy from the oscillator means only to the loading means. In this manner, the oscillator means produces the high-power signal, frequency and phase locked to the synchronizing signal at a substantially amplified power level, to provide for the synchronized, regenerative amplifier.

The present invention provides a new approach to high-power, microwave amplification over a wide band of frequencies. Effective amplification is obtained with the synchronized, regenerative amplifier of the present invention by means of a synchronizing signal provided by a relatively low-power generator means to control the phase and frequency of a high-power signal provided by a relatively high-powered output generator means. This control or locking of the output high-power signal to the synchronizing signal takes place because of the extraordinarily high damping introduced by tightly coupling the load to the high-power output generator. The low-power generator, the high-power generator, and the load are isolated from each other by means of a non-reciprocal, directional coupling device. The amplifier is termed a synchronized, regenerative amplifier, implying that the high-power generator means produces a build up of oscillations at the frequency of the synchronizing signal by virtue of the internal regeneration and the energy in the synchronizing signal.

For a better understanding of the invention, together with other and further objects thereof, reference is made to the following description taken in connection with the accompanying drawings, and its scope will be pointed out in the appended claims.

*Description and operation of the regenerative amplifier illustrated in FIGS. 1–4*

Figure 1:
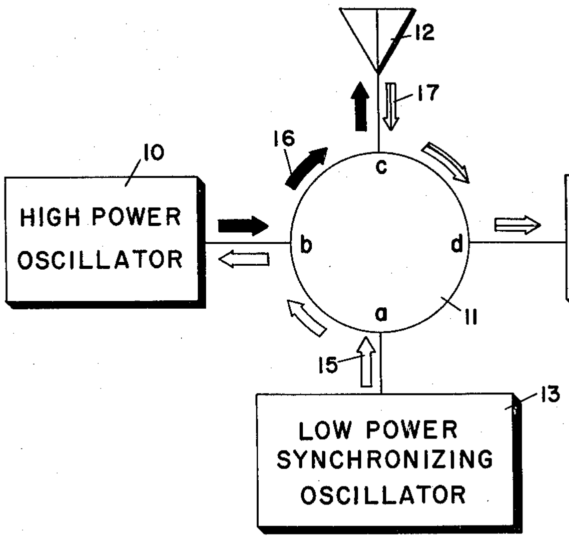
FIG. 1 is a schematic block diagram of a signalling apparatus utilizing a synchronized, regenerative amplifier embodying the present invention.

Referring now to the drawings and with particular reference to FIG. 1, there is here illustrated a synchronized, regenerative amplifier embodying the present invention as used in a signalling apparatus. Such an apparatus is generally useful, for example, in radar systems, countermeasure systems, altimeters, navigational and other control devices.

The schematic block diagram of the signalling apparatus shown in FIG. 1 includes the synchronized, regenerative amplifier of the present invention. The amplifier includes an oscillator or generator means 10 for generating a relatively high-power, radio-frequency output signal, and a synchronizing generator 13 for providing a relatively low-power, synchronizing signal, the generator 13 being coupled to the oscillator 10 through a non-reciprocal, ferrite-circulator, directional-coupling means 11. The amplifier, as shown, is coupled to a loading means, the antenna 12 and a receiver 14. The antenna 12 is so coupled through the ferrite circulator 11 to the oscillator 10 as to provide loading such as to tend to maintain the oscillator 10 quiescent. More particularly, the oscillator 10 is coupled from a terminal branch *b* of the non-reciprocal, directional coupler 11 through a terminal branch *c* to a useful load such as the antenna 12. The low-power, synchronizing oscillator 13 is coupled to the oscillator 10 through the terminal branch *a* of the coupler 11. The receiver 14 is coupled to an antenna 12 through the terminal branch *d* of the coupler 11.

The coupler employed herein may be, for example, a ferrite device of the type illustrated and described by B. D. H. Tellegen, Phillips Research Reports, vol. 3, pp. 81–101 (1948); vol. 3, pp. 321–337 (1948); vol. 4, pp. 31–37 (1949); vol. 4, pp. 366–369 (1949) and in an article by C. L. Hogan entitled "The Ferromagnetic Farraday Effect at Microwave Frequencies and Its Applications: The Microwave Gyrator," Bell System Technical Journal, vol. XXXI, Number 1, pp. 1–31, January 1952. Such a coupler is familiarly known in the art as a circulator.

The device is said to be non-reciprocal in that energy introduced at one terminal can only travel in one direction to the next terminal. This energy at terminal *a* is translated only to terminal *b*, energy introduced at terminal *b* is translated only to terminal *c*, energy introduced at terminal *c* is translated only to terminal *d* and energy introduced at terminal *d* is translated only to terminal *a*. With the non-reciprocal coupler, if the oscillators 10 and 13 are transposed, energy from the oscillator 13 is directed to antenna 12, not to the oscillator 10. If the device were reciprocal and the oscillators 10 and 13 interchanged, energy from the oscillator 13 would still be directed to the oscillator 10. If oscillator 10 and antenna 12 were interchanged, and the coupler reciprocal, energy from the oscillator 10 would be translated to antenna 12. In contrast, where, as here, the coupler is non-reciprocal, interchanging the oscillator 10 and antenna 12 effects a radical change in the energy translation paths; energy from oscillator 10 is directed to the receiver 14, not to antenna 12.

In a practical device the degree of isolation in the reverse direction is of the order of 40 db. In a system of the character illustrated, a number of well-known devices may be used for the oscillator 10, such as klystrons, magnetrons, high frequency triodes, and so forth. The antenna 12, the receiver 14 and lower-power generator means 13 are conventional in design. A wide range of devices well known in the art may be used. The lower power generator means 13 is interchangeably described as an oscillator means or a generator means implying, of course, that some sort of signal generator source exists in the system, even though the immediate source of the synchronizing signal may be derived from an amplifier. Any of a number of well-known microwave oscillators or oscillator-amplifier systems may be used for this purpose. For the antenna 12, such well-known devices as radiating horns, dipoles, antenna arrays, etc. may be used. The receiver may be of the well-known super-heterodyne design and operable over the microwave frequency range. The system, as shown, is preferably operated in the range of from 1,000 to 35,000 megacycles. In the drawings, energy translated from the oscillator 13 to the oscillator 10 is indicated by the outline arrows 15, from the oscillator 10 to the antenna 12 by the heavy black arrows 16 and from the antenna 12 to the receiver 14 by the striped arrows 17.

For the purpose of description of the operation of the amplifier that follows, the frequency of operation is taken to be 10,000 megacycles. The system as illustrated in FIG. 1 may generally be described as a synchronized, regenerative, high-power oscillator transmitter, coupled to an antenna in duplex with a receiver. The oscillator 10 is synchronized both in phase and frequency to the oscillator 13. The oscillator 10 is normally heavily loaded and tends to be quiescent except when the synchronizing signal is injected.

The oscillator 10 and oscillator 13 are so designated because some form of oscillator is normally used for these circuit functions. It is to be understood, however, as will be described in greater detail below, that the term generator or amplifier may be used in place of oscillator. This, of course, implies that the oscillator 10 may be classified as a regenerative amplifier and the oscillator 13 includes a generator means, however remote.

In the system as illustrated, for the purpose of discussing one operation, the components are considered to be ideal and ideally matched to each other. Based on this assumption, no reflections take place and the receiver is considered to be infinitely isolated from the magnetron oscillator 10. This implies perfect duplexing between the high-power oscillator 10 and the receiver 14. The oscillator 10 is synchronized by energy from the oscillator 13 which is translated in the circulator 11 from the terminal branch *a* only to the branch *b* and, thence, to the oscillator 10. The high-power output of the oscillator 10 is translated through the circulator 11 from the terminal branch *b* to the branch *c* and is then transmitted by the antenna 12. Relatively weak signals received by the antenna 12 are translated through the circulator 11 from the branch *c* to the branch *d* and, thence, to the receiver 14. Note that substantially all of the energy from the oscillator 13 is translated only to the oscillator 10 and substantially all of the energy from the oscillator 10 is translated only to the antenna 12.

For C.W. operation, the oscillator 10 is continuously synchronized by energy from the oscillator 13 with continuous and complete duplexing from transmit-to-receive. For pulse operation, the oscillator 10 is pulled on and off periodically, in the well-known manner. At the same time, the oscillator 13 injects continuously a C.W. signal into the oscillator 10 which tends to synchronize the pulses and obtain both phase and frequency coherence from pulse to pulse. As noted in the above-referenced patent application, the synchronizing signal may itself be pulsed and the oscillator 13 may be cascaded to obtain various power levels of injection.

In a practical system, the match to the antenna may not be perfect; hence, energy transmitted from the oscillator 10 may be reflected and received by the receiver 14. In a practical situation of this type, an added degree of isolation between the receiver and the oscillator 10, or even between the oscillators 13 and 10, may be required. However, the degree of isolation between units and the specific means for achieving it are not important to the present invention, being well known in the art, and no complete discussion thereof will be considered herein.

An important aspect of the invention lies in the character of the loading that takes place. For self-starting microwave oscillators, it is generally accepted practice that the loaded Q or $Q_L$ of the system should be of the order of 100 to 300. Here, the $Q_L$, most generally speaking, is essentially the ratio between the energy stored in the oscillator and the energy dissipated in the load per cycle. For the oscillator to be self-sustaining, some of the energy generated must be returned for regeneration purposes to overcome the losses in the system. The rest of the energy is, of course, transmitted to the load. Clearly, if an oscillator is sufficiently heavily loaded, insufficient regeneration takes place to permit self starting. Most of the energy is abstracted from the oscillator and translated to the load; hence, self-starting or build-up of free oscillations tends to be damped out. The oscillator is then said to be quiescent or blocked at the desired frequency of oscillation. Here the term quiescent includes the region of the threshold of oscillation. If the oscillator is so loaded that the loaded Q of the system is of the order of 10 or less, it is so loaded as to tend to maintain the oscillator 10 quiescent.

It is to be noted, however, that, whether or not the oscillator is indeed completely blocked does not negate the impact of the present invention. As will be seen from the more detailed discussion of the theory of operation below, the impact of the synchronizing signal is to force the oscillator to operate at the frequency and phase of the synchronizing signal. The forcing or synchronizing signal causes forced oscillations to build up. These forced oscillations saturate the system and, hence, suppress free oscillations of other than the desired frequency and phase. The synchronizing oscillator 13 provides sufficient energy to the oscillator 10 to overcome the effect of loading and induce self-sustained oscillations at the desired frequency of operation. At that point, the oscillator continues to build up, phase and frequency locked to the synchronizing signal.

Figure 2:
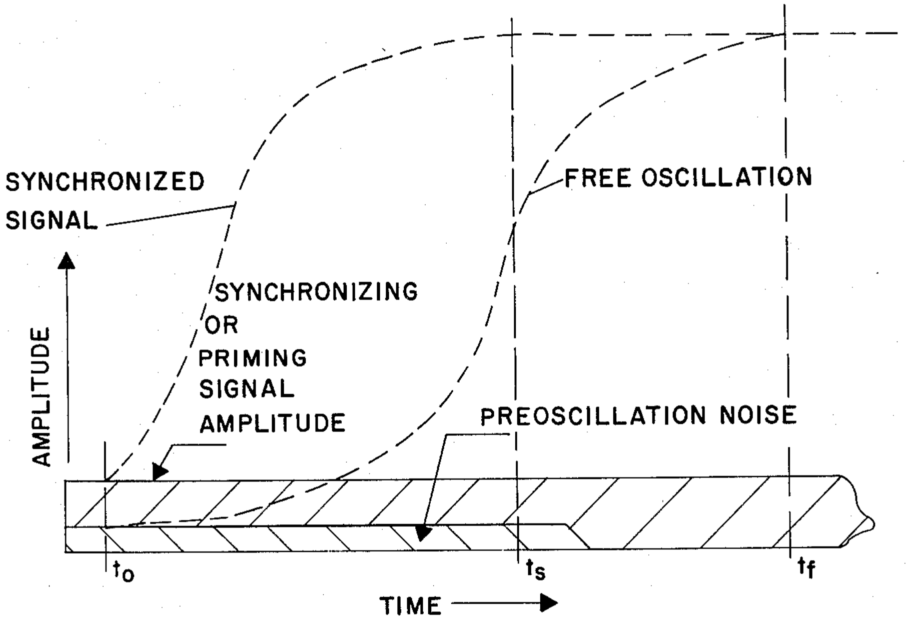
FIG. 2 is a graph illustrating the amplitude of oscillations versus time in the amplifier of FIG. 1.

The graph in FIG. 2 illustrates the simplified starting process and build-up of oscillations for a synchronized oscillator. The curves, as shown, illustrate the enhanced speed with which a synchronized oscillator builds up oscillations compared with an unsynchronized oscillator, that is, compares the build-up time of forced versus free oscillations. The starting time, of course, is substantially reduced by the injection of a synchronizing signal as shown. The period of build-up is reduced further by virtue of the increased loading as used in the present invention; thus, there exists a substantial difference between the time of saturation of the free oscillations $t_f$ and the time of saturation of the synchronized oscillations $t_s$. This time difference is critical for some applications. The rise time for pulses, for example, may be reduced from the order of 0.1 microsecond for prior art devices to 0.01 microsecond or less.

Figure 3:
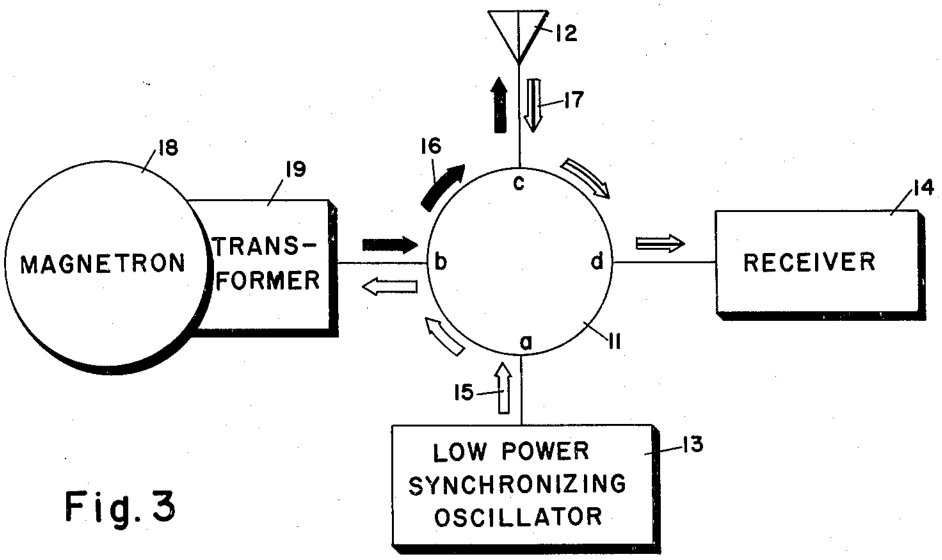
FIG. 3 is a schematic block diagram of a signalling apparatus utilizing a synchronized, regenerative amplifier, specifically, a magnetron circuit, embodying the present invention.

As noted above, the preceding remarks characterize a regenerative amplifier embodying the more general concepts of the invention. Referring now more particularly to FIG. 3, there is here shown an embodiment of the invention as applied particularly to a magnetron device. Here a magnetron 18 and transformer 19 are coupled to the terminal branch *b* of the non-reciprocal, directional coupler 11 in the place of the oscillator 10 in FIG. 1. Conventionally, the required $Q_L$ for a magnetron oscillator circuit to oscillate properly is considered to be of the order of 100 to 300. This implies that there is a purposeful impedance mismatch between the characteristic impedance of the magnetron anode and the impedance of the loading device. As an example, the output load impedance may be of the order of 4 ohms coupled to a magnetron anode having a characteristic impedance of the order of 400 ohms to provide a minimum transfer of energy, namely, 100 times more energy is stored in the magnetron circuit than is dissipated in the load circuit. Thus, one-hundredth of the energy is dissipated in the load while $^{99}/_{100}$ of it is used for regenerative or feed-back voltage to maintain oscillations. In the preferred mode of operation of the present device, the transformer matches the impedance of the output load to the impedance of the magnetron anode more or less exactly.

An important principle involved in the present device relates to the amount of feed-back energy available. If the feed-back voltage is less than enough to maintain self-sustained oscillations, no signal oscillations build up unless a forcing signal is introduced. Such a forcing signal provides sufficient regeneration for the oscillator to sustain a build up of oscillations to provide effective amplification of the synchronizing signal. In the event that the feed-back energy is sufficiently great for self-starting of oscillations and no forcing signal or synchronizing signal is introduced, build up of free oscillations at arbitrary frequencies takes place. When the forcing signal is introduced, forced oscillations are built up at the desired frequency, as defined by the frequency of the synchronizing signal to effectively damp out oscillations at undesired frequencies.

The term "forced oscillation" is particularly appropriate to the condition when the oscillator is capable of building up free oscillations at some arbitrary frequency. A forcing signal is then introduced which pulls the frequency of oscillation to lock with the frequency of the synchronizing signal. Signals of frequencies that are different from the desired frequency are suppressed and damped out. The resultant oscillation is thus forced.

Maximum gain-bandwidth product occurs when regeneration is of such a magnitude as to bring the system to the threshold of oscillations. It is not significant whether the threshold of oscillations is approached from the point of view of the regenerative amplifier or the synchronized oscillator, but in either case, the complete analysis of the device must include the possibility of free oscillations.

From the point of view of the oscillator, the threshold of oscillations may be reached through loading of the system such that the losses just overcome the first order negative conductance of the system. If the input signal is of sufficient magnitude or close enough in frequency to the natural resonance, only forced oscillations exist—in other words, the free oscillations are suppressed. This phenomenon is due to the non-linear properties of the system, for if forced oscillations are established sufficient in amplitude to bring the system to saturation, no energy is available for a weak signal to build up into oscillations.

*Description and operation of the magnetron amplifier illustrated in FIGS. 5–9*

Figure 5:
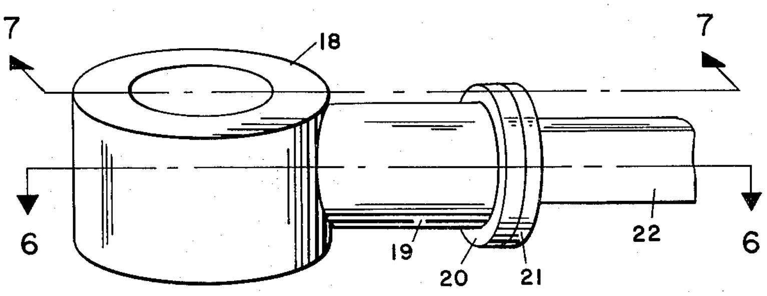
FIG. 5 is a front perspective view of an assembly including a magnetron, anode, transformer, and wave guide section as used in the present invention.

Referring now to FIGS. 5–9, and to FIG. 5 in particular, there is here illustrated a perspective view of a magnetron and transformer as used in a magnetron amplifier embodying the present invention in which the high-power oscillator is the magnetron oscillator 18. The magnetron 18 and the transformer 19, as shown in FIG.

5, are coupled through end flanges 20 and 21 to a rectangular wave guide 22 which is coupled to the terminal branch *b* of the circulator 11 as shown in FIG. 3. The transformer, as shown, has a cylindrical outer surface with an end flange 20 for attachment to the rectangular wave guide 22 as noted above.

Figures 6, 7:
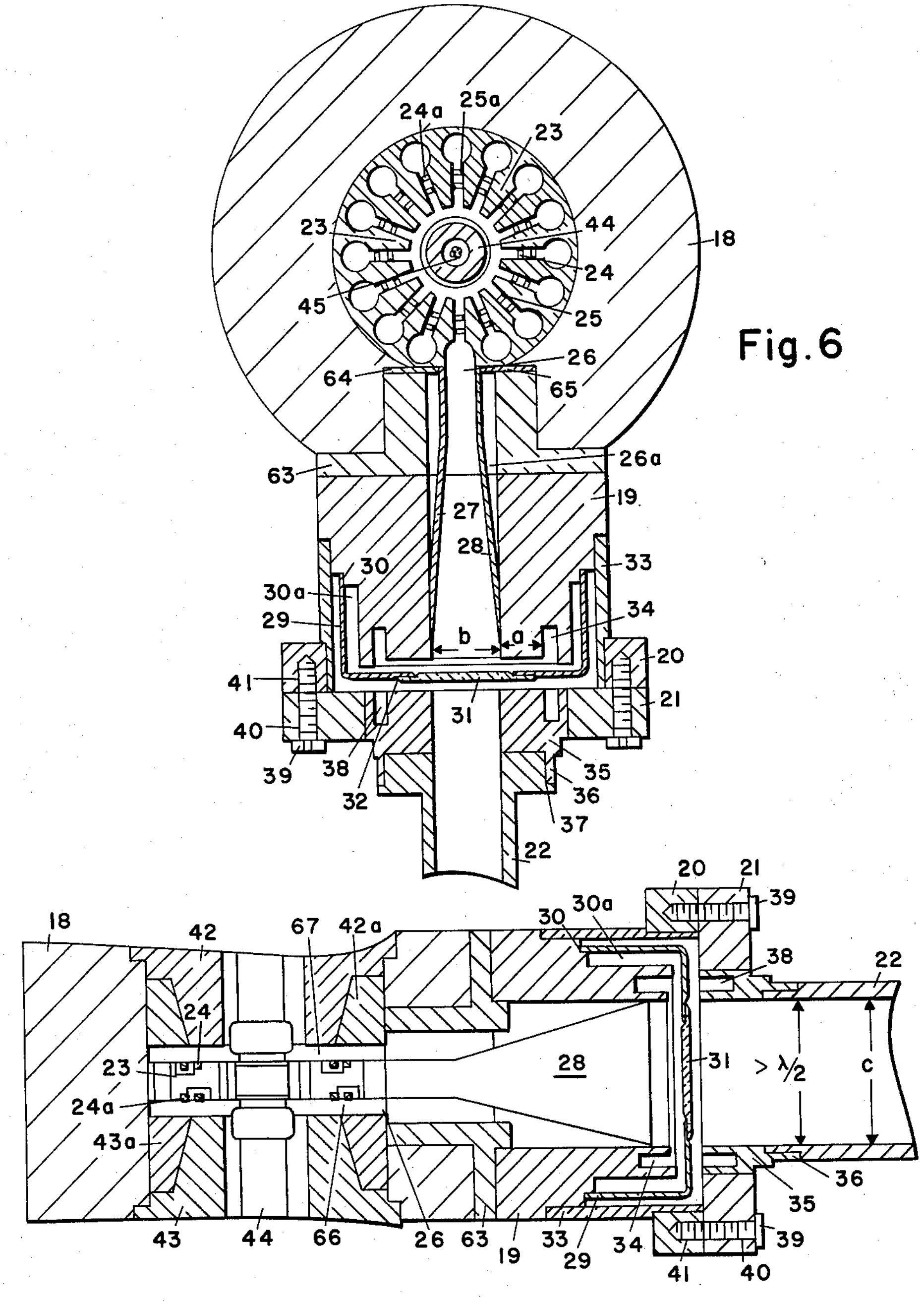
FIG. 6 is a horizontal, sectional view of the assembly of FIG. 5 taken along the lines 6—6.
FIG. 7 is a vertical, sectional view of the assembly of FIG. 5 taken along the lines 7—7.

In the sectional view of the oscillator and transformer in FIG. 6, the magnetron structure is shown with the pole pieces removed. A hollow cylindrical cathode 44 is centrally disposed relative to the magnetron anode and extends axially transversely to the plane of the anode. Disposed within the cathode 44 is a spiraled heater element 45 of conventional design. The anode illustrated at 23 is of the conventional strapped anode variety, wherein a plurality of resonant cavities are strapped together and energy is essentially introduced and removed from one of the cavities through a coupling iris 26. A transformer 19 is coupled to the anode 23 through the anode coupling iris 26 and is composed of a parallel plate transmission line disposed in a wave guide cavity of rectangular cross section. An end of the transformer is vacuum sealed and contains an output window 31 for the passage of electrical energy.

The resonant cavities are formed by a plurality of anode vanes 23, preferably formed of copper, which are affixed to the shell or body of the magnetron 18. The vanes extend radially outward from the cathode 44. The vanes are strapped together in the conventional manner by straps 24 and **24*a* preferably formed of copper. The strap 24 is connected, as shown, to a set of alternate vanes 23 at junctions 25; the strap 24*a* is connected to the remaining anode vanes at the junctions 25*a***.

The wall of the body of the magnetron 18 is affixed to an end of the transformer 19, preferably by brazing the two surfaces together. The transformer 19 is coupled to the anode structure through an output coupling iris 26 formed in the wall of the magnetron 18. A rectangular channel **26*a* is formed in the transformer cylinder 19 to correspond with the rectangular inside surfaces of the wave guide 22**. Here the electric fields extend parallel to dimension *b* between the opposite inside, conductive surfaces of the transformer 19. This is the short dimension of the guide and is below the cut-off frequency at which the guide may be used to transmit microwave energy at the desired frequency. A pair of impedance vanes 27 and 28 are affixed to the adjacent opposite surfaces of the channel **26*a*. The vanes converge together toward the output iris 26 to provide an impedance transformer to match the impedance of the anode to that of the wave guide 22. The plates or vanes are adjacently disposed and preferably of the order of 0.050 inch thick. They are transversely parallel, as shown. A pair of supporting members 64 and 65 are affixed to the end of the coupling member 63. The members 64 and 65 are elongated and of the same width as the ends of the vanes 27 and 28 to which they are attached. The support members 64 and 65 serve also to reinforce the walls of the magnetron 18 which surround the iris slit 26. As will be described in greater detail in conjunction with FIG. 8 below, the iris opening may be formed by overlapping conductive members to provide essentially an H-guide iris output for the magnetron anode. The conductive surfaces surrounding the cavity 26*a* in combination with the vanes 27 and 28 provide a shielded, parallel plate, transmission line for translating high-frequency energy over a substantial range of frequencies. The transformer effectively converts the high-frequency energy from the wave-guide mode present in the wave-guide section 22 to a parallel-plate TEM mode and effectively steps down the characteristic impedance of the wave guide to match the impedance of the anode and coupling iris. In this manner a broadband impedance transformer is provided. The magnetron anode and transformer are vacuum sealed by means of an output window 31 affixed to the end of the wall of the transformer 19. A metal cup 29, preferably of an alloy that can be welded to both glass and metal, is affixed to a shoulder 30 formed in the outside wall of the transformer 19 as shown. An alloy that is useful for this purpose comprises a mixture of iron and nickel, and can be purchased under the trade name Kovar, as manufactured by Westinghouse Electric Company. The cup is preferably sealed to the shoulder 30 by brazing techniques. The window 31, preferably formed of glass, is disposed in a central opening formed in the cup and sealed to a shoulder 32 formed in the cup 29 as shown. The glass-to-metal seal is formed between the cup and the circumferential end of the window 31**.

The flange 20 is attached to the wall of the transformer 19 by means of a ring 33, preferably formed of brass, by, for example, brazing. An annular slot 34 is coaxially formed in the end of the transformer 19 to provide a high-frequency choke. The inside surface of the cup 29 and the shoulder 30 formed in the transformer wall 19 provide a chamber **30*a*. The chamber 30*a* is approximately one-half wave length long at the operating frequency to provide a short circuit from the cup to the end of the transformer wall adjacent the slot 34**. The dimension *a* plus the depth of the slot 34 are so chosen as to be approximately one-half wave length long at the operating frequency to provide a short across the window 31 from transformer 19 to a wave guide 22. The dimensions of the chamber **30*a* and slot 34 are determined experimentally in conjunction with the dimensions and dielectric constant of the window 31 to match the apparent impedance of the window 31** and provide a relatively broadband resonant, transmission window.

A cylindrical member 35, having a hollow, cylindrical extension 36 is affixed to the inside surface of the flange 21 as shown, preferably by brazing techniques. The member 35 is also affixed to the rectangular guide 22 by means of a cylindrical shoulder 37 formed at one end of the wall guide 22, as shown. The adjacent surface of the guide 22 and the member 35 are then connected together, preferably by brazing. The member 35 has a conventional annular wave guide choke slot 38 formed in an end. The slot 38 cooperates with the slot 34 and is dimensioned approximately one-quarter wave length long at the operating frequency and is displaced from the inside surface of the member 35 by approximately one-quarter wave length to continue the short circuit through the window 31. The guide 22 is assembled to the transformer 19 by a plurality of circumferentially disposed bolts 39 which extend through clearance holes 40 in the flange 21 to the threaded bolt holes 41 in the flange 20. As noted above, the dimensions of the choke slots 34 and 38 are so chosen as to provide a low impedance path through the window 31. As shown in the drawing, the hollow transformer 19, the wave guide 22, and opening in the member 35 have a rectangular cross section chosen in the well-known manner to provide wave-guide propagation of the microwave energy, preferably in the $TE_{0,1}$ mode.

Referring now to FIG. 7, there is here illustrated a vertical sectional view of the magnetron structure in FIG. 5 illustrating particularly the location of the permanent magnet pole pieces and filler elements, the cathode and the relative disposition of the anode within the anode cavity. The anode is centrally disposed and suspended between a pair of annular, permanent magnet pole pieces 42 and 43 and annular filler members **42*a* and 43*a*. The permanent magnet pole pieces 42 and 43 have centrally disposed openings or holes formed therein to enable insertion of the cathode assembly. The pole pieces 42 and 43, while generally annular in shape, have truncated, conical extensions designed to mate with the filler members 42*a* and 43*a* as shown. The filler members 42*a* and 43*a* are formed of non-magnetic material. The pole pieces 42 and 43, the filler members 42*a* and 43*a* and the opposite sides of the anode structure provide a pair of end spaces 66 and 67**.

The vanes 23 of the anode extend radially outward from the cathode 44. A plan view of the impedance vane 28 is clearly illustrated in FIG. 7. It is to be noted that the vane is tapered toward the iris 26 from the junction where it is affixed to opposite wall surfaces of the transformer 19. The inside conductive surfaces of the transformer 19 together with the tapered, converging, impedance vanes 27 and 28 provide a shielded, parallel-plate, transmission line for translating high-frequency energy having a substantial range of frequencies. These vanes also provide a wide-band, impedance transformer to convert the high-frequency energy from the wave guide 22, which is translated in the conventional wave-guide mode, preferably $TE_{0,1}$, to the parallel-plate TEM mode and effectively to step down the characteristic impedance of the wave guide. Note that the boundary defining dimension *c* is greater than one-half wave length at the operating frequency, for example, 10 kilomegacycles. The guide 22 is elongated and extends electrically into the transformer 19 to provide a further elongated wave-guide section with a conductive surface forming a transverse closed loop with no boundary defining dimension greater than one-half wave length for a predetermined cut-off frequency.

Figures 8, 9, 10:
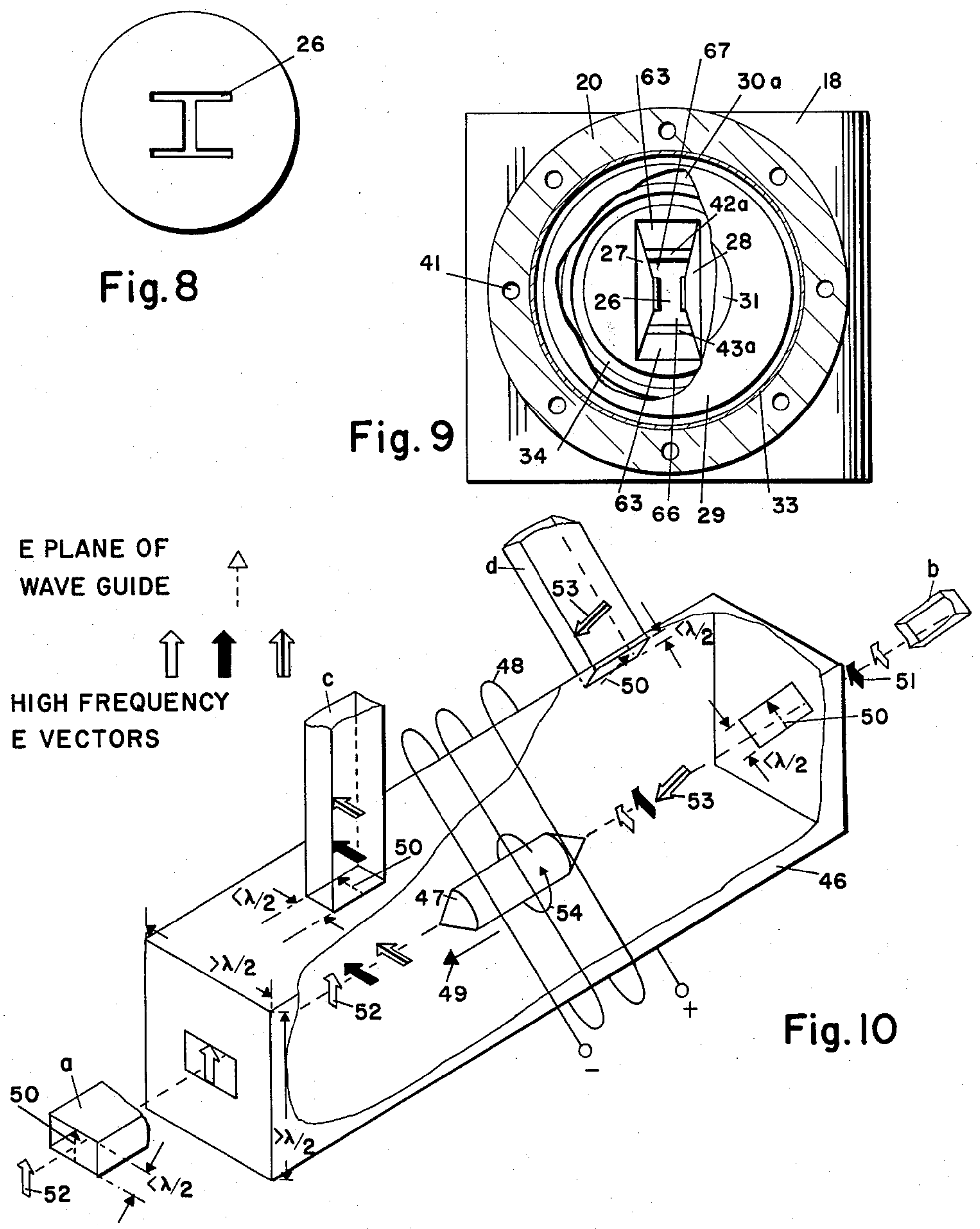
FIG. 8 is a detailed, schematic view of the effective output iris of the magnetron anode.
FIG. 9 is a detailed view, partly fragmentary, partly in section, of the output transformer window and output iris.
FIG. 10 is a front perspective view, partially schematic and partially fragmentary, of a ferrite circulator as used in the present invention.

Referring now to FIG. 8, there is here illustrated a detailed, schematic drawing representative of the anode output iris coupling 26 of the magnetron 18. The iris is essentially a section of H-guide which has the same effective electrical-translation characteristic as the inside boundary-defining dimension of the wider guide 22. The principles of H-guide are well known. The guide is essentially capacitively loaded to increase its effective electrical dimensions while physically being smaller. It is preferable to use such a section in order to meet the physical limitations of the size of the magnetron anode structure.

The iris 26 need not be formed explicitly in the wall of magnetron 18. The effect of a cut tangential to the anode circumference is to provide a slit in the wall of the adjacent anode cavity to expose the end spaces 66 and 67 between the anode and the magnet pole assembly. The metallic supporting members 64 and 65 and the coupling piece 63 cover so much of the end space as is required to provide an effective H guide iris opening of the proper dimensions. As shown particularly in FIG. 6 the spacing between the vanes 27 and 28 is chosen to correspond with that between the extreme ends of the vanes 23 defining the coupling cavity. This provides maximum coupling between the anode cavity and the transformer. The coupling is basically capacitive; the anode slit presents a discontinuity across which a transverse electric field is developed. Coupling to the iris takes place across the central opening. As shown here the iris opening may be termed a "lazy-H," implying that the H-guide is rotated 90° from a true H configuration.

Referring now to FIG. 9, there is here illustrated the structure of the transformer output window 31 assembly and its associated components. The window 31 is shown fragmentary to reveal the disposition of vanes 27, 28, the iris 26, and the annular cup 29 in relation to the outer supporting ring 33. The location of the flange 20 in relation to the magnetron anode 18, the transformer inside surfaces and threaded mounting holes 41 is particularly illustrated.

The device, as described and illustrated in FIGS. 5–9 is directed, particularly, to a structure that enables tight coupling or heavy loading. The relationship between the magnetron anode and transformer structure as shown in FIGS. 5–9 to the system in FIG. 3 should now be clear. The wave guide 22 is connected to or forms part of the terminal branch *b* of the circular 11. Energy introduced to the circular 11, through the branch *a* from the oscillator 13 is directed to the branch *b*, then through the rectangular wave guide section 22, the transformer output window 31 and the transformer 19 where it is converted from a typical wave-guide mode of $TE_{0,1}$ to a parallel-plate mode. It is to be noted in this regard that the entire inner conductive surface of prior art transformers is tapered in the well-known manner to provide a non-resonant impedance transformer. Such a transformer continues to translate energy in the wave-guide mode. Here the vanes 27 and 28 are separate and disengaged or unattached to the inner conductive surfaces along the length of the vanes in the direction of propagation of energy. This permits a conversion from the wave-guide mode to the parallel-plate mode, as noted above. Here the direction of propagation is from the guide 22 toward the coupling iris 26 of the magnetron anode 18 or vice versa.

The characteristic impedance of the magnetron anode as seen through an iris similar to the iris 26 is of the order of 400 ohms. A typical characteristic impedance for the wave guide 22 is of the order of 600 ohms. This requires an impedance transformation provided by the transformer 19, which essentially matches these impedances to provide an output or loaded $Q_L$ for the system of one. For prior art devices, $Q_L$ is conventionally in the order of 100–300 in contrast with the preferred operating condition in the present invention wherein $Q_L=1$ or less. In the prior art, it is characteristic to mismatch the impedance of the magnetron anode by using a transformer such that the load impedance is, for example, transformed to the order of 4 ohms. This provides a mismatch of the order of 100 to 1. Most of the energy remains in the magnetron and very little of it is translated to the load. In the preferred mode of operation of the present invention, however, an equal amount of the energy is stored in the magnetron and is translated to and absorbed by the load.

The taper dimensions of the vanes 27 and 28 are obtained by trial and error and cannot be completely theoretically defined. A rough approximation suggests that the vanes 27 and 28 should be approximately an integral number of half-wave lengths long. In the preferred embodiment the vanes are 2.110 inches long and converge together at the rate of 0.254 inch per inch relative to dimension *b* of the guide. The taper of the vanes 27 and 28 is of the order of 0.535 inch per inch relative to dimension *c* of the guide.

*Description and operation of the non-reciprocal coupler in FIG. 10*

Referring now to FIG. 10, there is here illustrated a non-reciprocal, ferrite circulator, directional coupler of the type utilized in the embodiments of FIGS. 1 and 3. The letter designation for the branch arms *a*, *b*, *c*, and *d*, respectively, corresponds with the letter designations in FIGS. 1 and 3.

The four branch arms of the circulator are formed from rectangular wave guide each having its E-plane of polarization oriented at mutually different angles as will be discussed in greater detail below. The terminal branches are all connected to a central wave guide which can be round or square to permit rotation of the plane of polarization within this section. Rotation of the plane of polarization of energy passing through the central part of the circulator, here the square guide, is obtained by virtue of a unidirectional, bias magnetic field directed through an axially oriented ferrite rod and provided by a direct current magnetic coil.

Thus, the central part of the coupler includes a square wave guide section 46. Centrally located within the guide 46 is a tapered ferrite rod 47 axially oriented as shown and a magnetic coil 48 surrounding the wave guide 46 in the vicinity of the rod 47. The guide 46 is usually made of copper or brass to permit the flux lines developed by the coil 48 to pass freely. Direct current is so applied to the coil 48 as to provide a magnetic flux in the direction indicated by an arrow 49. Dashed line arrows 50 indicate the direction of the E-plane of the terminal branch wave guides *a*, *b*, *c*, and *d*. The branch guide *b* corresponds with the wave guide 22 in FIGS. 5–9. Branch guide *a*, as shown, is so oriented that its E-plane is vertical; relative thereto, the E-plane of the branch guide *c* is perpendicular, the E-plane of the branch guide *d* is at an angle of +45°, and the E-plane of the branch guide *b*, corresponding to the wave guide 22 in FIG. 5, is oriented at −45°. The dense black arrows 51 characterize the orientation of the E-vector or plane of polarization of the incident plane-polarized energy travelling from the branch *b* to the branch *c*. This corresponds to energy travelling from the magnetron transformer 19 through the branch *b* to the branch *c* of the circulator 11 and thence out the antenna 12, which presents a load for the transformer and the magnetron. The outlined arrows 52 characterize the orientation of the E-vector or plane of polarization of incident energy travelling from the branch *a* to the branch *b*. This corresponds with energy travelling from the synchronizing oscillator or generator 13 through the branch *a*, thence through the branch *b* of the circulator 11 and then injected into the magnetron 18 through the transformer 19. The striped arrows 53 characterize the orientation of the E-vector or plane of polarization of incident plane-polarized energy travelling from the branch *c* to the branch *d*. This corresponds with energy incident upon the antenna 12 which is translated to the circulator 11 through the terminal branch *c* and then circulated to the terminal *d* and thence to the receiver 14 connected thereto.

As noted above, the coupler illustrated in FIG. 10 utilizes the so-called microwave Faraday effect wherein the plane of polarization of incident energy is rotated by passing the energy through an axially oriented, unidirectional, bias magnetic field. This principle is combined with well-known wave-guide principles in determining the propagation paths of electromagnetic energy in the coupler. The rectangular guide, for example, is conventionally so dimensioned as to provide a boundary defining dimension for the E-plane of plane-polarized energy greater than one-half wave length at the operating frequency and generally longer than the dimension parallel to the E-plane vector. The shorter dimension is parallel to the E-plane vector and is chosen to be below cut off or less than one-half wave length of the operating frequency. If the E-vector of incident energy is parallel to the E-plane of the guide, the energy is propagated by the guide; if the two vectors are orthogonally oriented, the energy is reflected. In the coupler shown in FIG. 10, the Faraday rotation is provided by ferrite rod 47 through which a magnetic field is axially directed by passing a direct current through the coil 48. Energy entering the branch *a* is vertically polarized as shown by the outline arrow 52. In this embodiment, when the energy passes through the ferrite rod 47 from left to right as shown, it is rotated counter-clockwise 45°. Since the E-vector of the energy is then co-linear with the E-plane vector of the branch *b*, the energy is transmitted through the branch *b*. Energy entering the branch *b* is initially characterized by an E-vector oriented at −45° as indicated by the heavy black arrow 51. When this energy passes through the ferrite rod 47, it is rotated in the direction indicated by the arrow 54. Note that the energy is rotated in the same direction relative to the rod 47, regardless of direction of propagation; hence, relative to the direction of propagation, energy entering the vicinity of the rod 47 from the right is effectively rotated clockwise, whereas energy entering the vicinity of the rod 47 from the left is effectively rotated counter-clockwise; thus, the energy, as indicated by the heavy black arrow 51, is rotated −45°. The E-vector of this energy is then orthogonally oriented relative to the E-plane vector of the branch *a* and is reflected by that branch. The E-vector of this energy, however, is parallel to and coincides with the E-plane vector of the branch *c* and is, therefore, transmitted by that branch. Note that the coupler is thus a non-reciprocal device. If the device were reciprocal, energy entering the branch *b* would be transmitted through the branch *a*; whereas, energy entering through the branch *a* would effectively be transmitted through the branch *b*.

Energy entering the branch *c*, as indicated by the striped arrow 53, is horizontally polarized relative the E-plane of the branch guide *a*. This energy is orthogonally polarized relative the vertical polarization of the branch guide *a*; hence, it is reflected and passes through the ferrite rod 47. The plane of polarization is rotated counter-clockwise 45° to coincide with the E-plane of the branch guide *d*. The energy from the terminal *c* thus is transmitted through the guide *d*. This energy, having been rotated counter-clockwise 45° relative to its direction of propagation, is orthogonally polarized in relation to the E-plane of the branch guide *b*, as indicated by the orientation of the striped arrow in the region between the rod 47 and the branch *b*.

Figure 11:
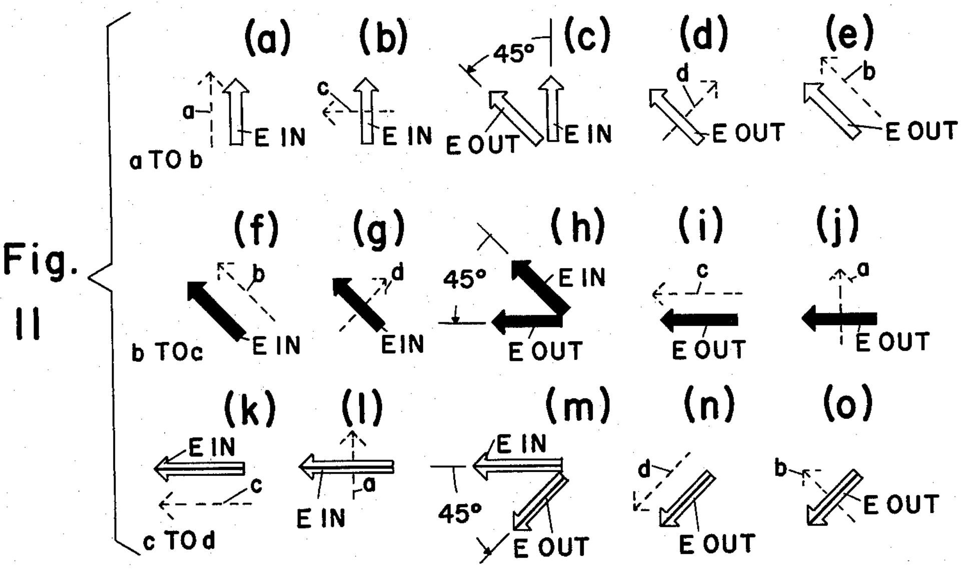
FIG. 11 is a schematic diagram illustrating certain vectoral relationships of the energies in the circulator of FIG. 10.

Referring now to FIG. 11, the diagram (*a*) through (*e*) illustrate the angular orientations of the E-vector of energy travelling from the branch *a* to the branch *b* and the E-planes of the various branch guides. The diagrams (*f*) through (*j*) illustrate the angular orientations of the E-vector of energy travelling from the branch *b* to the branch *c* and the E-planes of the various branch guides. The diagrams (*k*) through (*o*) illustrate the angular orientations of the E-vector of energy travelling from the branch *c* to the branch *d* and the E-planes of the various branch guides.

While a particular ferrite circulator non-reciprocal directional coupling device has been described and illustrated, it will be apparent that a number of such devices are available to perform the indicated task. In the device illustrated, as is apparent from the Hogan article referred to above, the degree of rotation is a function of the type and length of the ferrite rod, as well as the strength of the axial magnetic field supplied by the coil 48. Since the short dimension of the branch guides *a*, *b*, *c*, and *d* is chosen to be below cut-off at the operating frequency, for example, 0.5 inch at 10 kilomegacycles, when the E-vector of incident energy is perpendicular to the E-plane of the guide, the energy is reflected. It will be apparent from the discussion above that the coupler can thus be used to so couple the synchronizing generator means 13, the oscillator means 10, and the load means 12, illustrated in FIGS. 1 and 3, as to cause substantially all of the energy in the synchronizing signal to be translated only to the oscillator means and substantially all of the energy from the oscillator means to be translated only to the load means. In practice, the isolation between the various branches is, of course, finite; for example, of the order of −20 db to −50 db. Such reflections as are generated are of a relatively low order and do not present a problem for most applications. For greater clarity, the structure illustrated in FIG. 10 is greatly simplified relative to a practical device. The branch guides, for example, are typically tapered to provide a suitable impedance match between the branch guides and the central section of the coupler; further, it may be twisted 45° physically to provide co-linear inputs and outputs.

Figure 12:
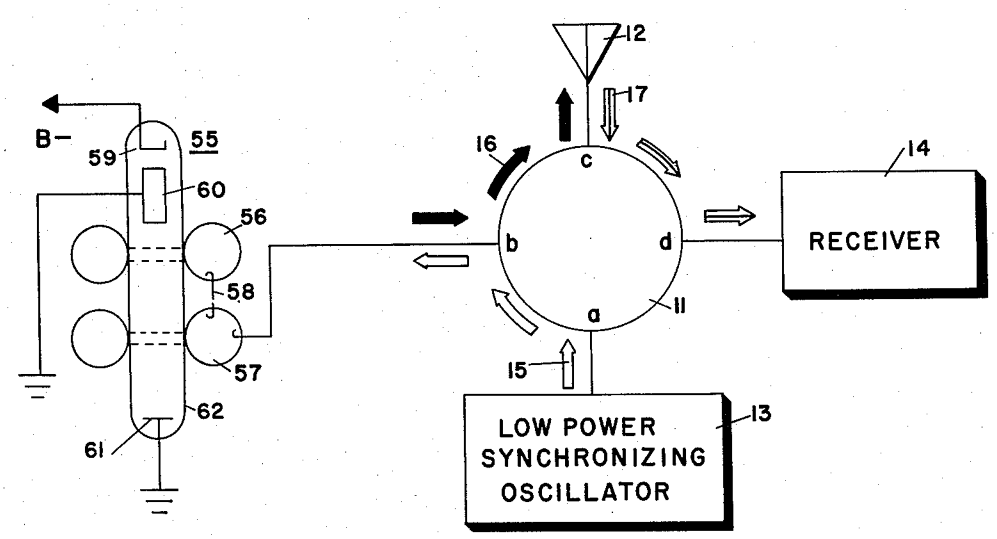
FIG. 12 is a schematic diagram of a signalling apparatus utilizing a synchronized, regenerative amplifier embodying the present invention as applied particularly to a klystron.

*Description and operation of the klystron amplifier device in FIG. 12*

Referring now to FIG. 12, there is here illustrated a synchronized, regenerative amplifier as adapted for use particularly with a klystron. Here the synchronizing generator 13, antenna 12 and receiver 14 are shown coupled to the branch arms *a*, *c*, and *d* of the circulator 11 respectively. The terminal branch *b* is shown coupled to a klystron generally indicated at 55. The klystron here illustrated is of the two-cavity type, having a cathode and accelerating anode, a buncher resonant cavity and a catcher resonant cavity and a collector plate. A pair of grid electrodes are associated with each of the cavities. All of the electrodes are enclosed and hermetically sealed by a tube. Here the catcher and buncher cavities are coupled together.

The klystron, as shown, has two cavities 56 and 57. A coupling member 58 couples the two cavities in an oscillator circuit. Each of the cavities 56 and 57 has a pair of velocity-modulating grids associated therewith in the conventional manner. Additionally, there is shown the electron gun providing a source for the electrons on the collector. The electron gun has a cathode 59 and accelerating anode 60. Disposed at the end of the tube is the collector plate 61. The various electrodes of the klystron are enclosed in a tube 62. The terminal branch *b* of the circulator 11 is shown coupled to the output cavity 57 of the klystron.

The resonant cavity 57 and the antenna 12 are tightly coupled to provide heavy loading, for example, $Q_L=1$. While the klystron here described and illustrated has dual cavities, the principles of this invention are clearly applicable to a single cavity reflex-type klystrons or the various multiple-cavity klystrons that are well known in the prior art. The synchronizing energy is translated from the generator 13 to the terminal branch *a* of the circulator 11, thence to the terminal branch *b* to the resonant cavity 57 of the klystron. Oscillations build up to provide a high power output which is applied through the branch *b* and thence to the branch *c* of the circulator 11 for transmission through the antenna 12. Received energy is captured by the antenna 12, translated through the branch *c* to the branch *d* and thence to the receiver 14. Reflected energy from the receiver appears at the terminal branch *a*, but is negligible for a matched receiver.

*Theory of operation*

The synchronized, regenerative amplifier of the present invention is a one-port, microwave amplifier which essentially obtains its high gain by use of regenerative feed-back and maximum frequency range of operation by virtue of an external synchronizing signal that forces the amplifier to produce a signal, frequency and phase locked to the synchronizing signal. The term "synchronized, regenerative amplifier" implies that the amplifier is regenerative throughout its range of operation and is synchronized. The amplifier includes a source of synchronizing signal which controls its frequency of operation.

The degree of amplification possible with the device and the range of frequencies over which the device is operable are closely related to the character of the loading. In accordance with the present invention, the high-power oscillator forming a part of the synchronized, regenerative amplifier is tightly coupled to the load. This, as noted above, is accomplished by means of a non-reciprocal, directional coupler which provides the necessary separation and isolation between the input and output signal. As is well known, the degree of amplification and the frequency range over which the device is operable are mutually related as well. More particularly, this is commonly expressed as the gain-bandwidth product, implying a reciprocal relationship. More particularly, if the gain is increased, the bandwidth is decreased; and vice versa. By tightly coupling an oscillator to its load, the frequency of operation of the oscillatory device can more easily be controlled by an external synchronizing signal. Clearly one can increase the loading on an oscillator to the point where it ceases to build up oscillations. It turns out that the maximum gain-bandwidth product occurs when the regeneration is so chosen as to cause the system to be on the threshold of oscillation.

The effect of heavily damping the microwave tuned circuit is to produce a slow variation in phase shift of the oscillator circuit with frequency. In order to realize high power and high efficiency, this damping is accomplished by tightly coupling the tuned circuit to the useful load. In order to obtain amplification, however, it is necessary to decouple the synchronizing signal from the load, that is, to buffer or insulate the power source from the drive source. If, for example, the drive source or the source of synchronizing signal is reciprocally coupled to the power source, it is not clear which device synchronizes the other. More probable than not, the high power source synchronizes the low-power source. This implies, of course, that the synchronizing signal has a power of the order of magnitude of the same order as the power source or greater; hence, no amplification.

A resonant cavity tightly coupled to an oscillator achieves tuning of the oscillator system through variations in the phase of the reflective wave. If the large reflection from the resonant tuning circuit is replaced by a signal of the same frequency from a well-isolated external source, the oscillator cannot distinguish it from the reflected wave; thus, the external signal may then be used to simulate the tuning of the resonant cavity. If the external signal is changed in frequency from the oscillator signal, the signal can pull the oscillator into synchronization with it, provided there is some phase for which the reactive effect of the simulated admittance of the signal is large enough to provide the necessary pulling. Because the external signal does not introduce a plurality of resonating modes, synchronization ranges are attainable beyond the range of cavity tuning.

There are really three conditions for operating a synchronized, regenerative amplifier in accordance with the present invention: (1) The loading is large but build-up of free oscillations may, nevertheless, take place at some arbitrary frequency with no drive present; (2) such that the system is on the threshold of free oscillations; and (3) that the loading is so great that the oscillator is quiescent. Here the term quiescent includes the region of threshold of free oscillations as well as the blocked region. Corresponding with above three conditions are:

(1) $1<Q_L<10$
(2) $Q_L \sim 1$
(3) $Q_L<1$

Even when the system is in condition (1), the loading means is so coupled to the oscillator means as to tend to maintain the oscillator means quiescent. Nevertheless, the injection of a synchronizing signal has the effect of generating forced oscillations which damp out free oscillations at some arbitrary frequency other than the designed frequency. When the amplifier is in the second or third condition, the oscillator is in a quiescent or blocked condition; hence, the oscillator is not self-starting and no free oscillations can build up. The effect of the synchronizing signal, then, is to cause build up of oscillations to take place by introducing the necessary feedback energy for regeneration to take place.

Frequency synchronization or the suppression of free oscillations by forced oscillation is peculiarly possible in non-linear oscillators. Examples of this phenomenon are well known. Huygens, for example, perhaps the first to observe this phenomenon, noted that two pendulum clocks hung on the same wall synchronize despite small differences in frequencies. Lord Raleigh observed that two organ pipes at slightly different frequencies oscillated at a common frequency when placed near each other. Appleton in 1922 and Van der Pol in 1927 developed a theoretical explanation of this phenomenon of forced oscillations.

Synchronization of microwave devices, however, presents a problem not readily solved. The frequency region over which synchronization occurs is directly proportional to the frequency of operation For high $Q_L$ circuits, the degree of synchronization that is possible exists only over a very narrow frequency region. By utilizing tight coupling and heavy damping, the loaded Q or $Q_L$ of the oscillator system is substantially reduced and greater control over the frequency of operation becomes possible.

Figure 4:
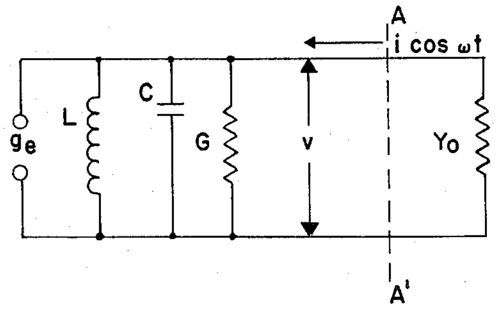
FIG. 4 is a schematic circuit diagram of the equivalent circuit of the magnetron amplifier of FIG. 3.

The following analysis is presented particularly with regard to FIG. 4, which is an equivalent circuit of the synchronized, regenerative magnetron amplifier circuit. While particularly directed to a magnetron circuit with little or no modification, the analysis is general in its application. The magnetron was chosen for the preferred embodiment because of its inherently advantageous high-power capabilities, high efficiency, simplicity and compactness of design and structure. The magnetron is capable of providing much more power per unit volume and weight than any other microwave device. Additionally, it can be designed to operate at any frequency in the microwave region at relatively high efficiencies. Heretofore, the principal disadvantage of the magnetron amplifier lay in its inability to provide simultaneously a high degree of amplification as well as broad band frequency operation for a given device.

In the following analysis the transformer is assumed to match the anode to the load admittance and to be wide band in its characteristics. The circulator is assumed ideal; namely, it transmits energy from one terminal branch to the next without insertion loss in the direction of the arrow while isolating terminal branches in the counter direction. In the equivalent circuit, the oscillator anode is represented by the parallel resonant circuit LCG, wherein:

$L$=equivalent inductance
$C$=equivalent capacitance
$G$=equivalent conductance
$i$=drive for synchronizing signal current=$I \cos \omega t$
$Y_0$=equivalent load admittance
$g_e$=magnetron electronic space charge
$v$=RF voltage.

The drive current is taken at the plane of reference A—A′ in FIG. 4, from the synchronizing generator 13 to the branch *a* of the coupler 11. The antenna 12 corresponds to the load admittance $Y_0$ matched to the magnetron anode. This appears as a resistive load because of the isolation effect of the circulator. The reactive loading effects of the space charge are omitted since its only effect on steady-state operation is as a correction in the frequency of the natural oscillation.

The fundamental equation of oscillation for a non-linear system is derived from the well-known nodal equation for voltage. From this, the so-called inhomogeneous Van der Pol equation is derived which is frequently written:

$$\ddot{v}-\omega_0\epsilon(1-v^2)\dot{v}+\omega_0^2v=-\omega^2E\sin\omega t \tag{1}$$

Solutions for this equation have the following form:

$$V'(\omega_0^2-\omega'^2)=0 \tag{2}$$

$$V'(V'^2+2V^2-4)=0 \tag{3}$$

$$V(\omega^2-\omega_0^2)=E\omega^2\sin\phi \tag{4}$$

$$V(V^2+2V'^2-4)=\frac{4E\omega}{\epsilon\omega_0}\cos\phi \tag{5}$$

From these equations an expression for gain-bandwidth product for a synchronized oscillator can be deduced. Equation 2 indicates that if the free oscillation V′ exists, it is at angular frequency $\omega_0$. From Equation 3 it appears that this oscillation at $\omega_0$ is possible only if $V^2<2$. On the other hand, if the impressed electromotive force of angular frequency $\omega$ is so large or ($\omega$—$\omega_0$) so small that $V^2>2$, then the oscillation voltage $v$ (of frequency $\omega$) suppresses the free oscillation; that is, the oscillation of frequency $\omega_0$ is damped. To define the extent of the region of frequency synchronization, the value of $\phi$ from Equation 5 must be determined for that value of V such that free oscillations are just suppressed. An analysis along these lines indicates that the formula for gain-bandwidth product is of the form:

$$(G_p^{1/2})(\Delta\omega)=\frac{\omega_0}{Q_L} \tag{6}$$

It will be apparent from Equation 6 that the product of the gain and frequency bandwidth is equal to the center frequency. Formula 6 has been experimentally verified as being a good approximation to this condition. This equation indicates that for $Q_L=1$ in the amplifier system illustrated in FIG. 3, the power oscillator may be frequency and phase locked to a signal 20 db down in power over a bandwidth of 10 percent. To accomplish this while achieving high efficiency and simplicity of design marks an important step forward in the field of microwave devices. Additionally, because of the nature of the circulator, the oscillator performance is free from pulling and long line effects tending to produce spurious oscillations.

The transient build up of oscillations varies in accordance with the amplitude of the forcing signal or synchronizing signal. It is quite clear that an increase in the amplitude of the synchrinizing signal aids to build up forced oscillations at the synchronizing frequency much the same as an increase in free oscillation noise aids to build up the free oscillations; thus, it turns out that despite the heavy loading, oscillations build up much more rapidly than in conventional microwave devices. During the initial period of build up the synchronizing signal serves to provide a strong field for phase focusing the space charge, in the case of the magnetron while during the latter period of build up the low Q system allows rapid change in the magnitude of the RF envelope. If the regeneration is such that the magnetron oscillator is maintained in the region of the threshold of oscillations, further reduction in $Q_L$ provides a tremendous increase in gain-bandwith product. Thus, for $Q_L=0.1$, a minimum power gain of 34 db over a frequency bandwidth of 20 percent can be realized. The system in the synchronized condition cannot change frequency from that of the forcing or synchronizing signal. Disturbances in free oscillation, such frequency pushing, pulling, and thermal effects, are evidenced not as frequency changes but as shifts in the phase angle between synchronizing and output signal. Its magnitude can be calculated from Equation 4 above.

It becomes apparent, however, that a substantial improvement in stability and noise characteristics is obtained from an amplifier embodying the present invention. The use of the circulator in the manner of the present invention further frees the system from pulling and long line effects. Because the forced oscillations build up from a strong sinusoidal signal rather than noise, the present amplifier has particular application for pulse systems to reduce substantially such effects as pulse-to-pulse time jitter and missing pulses.

The principles of the present invention are applicable to a device which is of great interest, namely, a heaterless cathode or cold cathode magnetron. Because there are RF fields present during the application of anode voltage, some free electrons bombard the cathode, resulting in secondary emission of electrons. If the cathode is coated with a material, as for example magnesium oxide which has a secondary emission ratio greater than unity, a build up in current occurs. Emission started in this manner can be sustained with a heaterless, solid cathode. This has a tremendous impact on prior art limitations of performance due to arching, thermal dissipation and life arising from the use of a heater.

The present invention has indeed tremendously enhanced the field of microwave devices, in particular microwave amplifier. As a consequence of its non-linear properties, the magnetron oscillator in particular may be operated in a synchronized condition, phase and frequency controlled by a forcing or synchronizing signal. The magnetron oscillator assumes all the properties of an amplifier except that of amplitude response, since the output power is relatively independent of small variations in input power. To obtain a large gain-bandwidth product, the magnetron anode admittance is matched in load by means of an output transformer. Under these conditions, free oscillations are suppressed over a wide band of frequencies while the synchronizing signal provides the condition for resonance at its frequency.

By the use of a circulator, efficient coupling of the synchronizing signal to the magnetron anode and a useful load is accomplished while obtaining isolation between the output and input signals. Under these conditions, the minimum power gain of 20 db over 10 percent bandwidth is obtained. Much larger gain-bandwidth products are obtainable with an amplifier embodying the principles of the present invention than were previously possible with prior art devices. Additionally, the circulator provides a mechanism for duplexing between transmitter and receiver and isolates the oscillator from pulling and long line effects.

The invention provides a new approach to wide band, high-power, microwave amplification, and is particularly applicable where high efficiency with minimum size and weight are required. Since the gain-bandwidth product is enhanced with increase in frequency, devices embodying the present invention are particularly useful at the high end of the microwave frequency range.

While applicant does not intend to be limited to any particular shape or sizes of parts in the embodiment of the invention just described, there follows a set of sizes and dimensions for the more important components that are particularly suitable for a synchronized amplifier of the type represented by the magnetron oscillator in FIGS. 5–9:

| | |
|---|---|
| Frequency of operation……kilomegacycles | 9.375 |
| Gain……db | 20 |
| Magnetron | 4J50 |
| Vanes 27 and 28 (Length 2.110" by width 0.250"): | |
| Length of taper……inch | 1.615 |
| Length of extension……do | 0.495 |
| O.D. Transformer 19……do | 2.170 |
| Depth of slot 34……do | 0.330 |
| Width of slot 34……do | 0.112 |
| Distance of slot 34 from adjacent inside wall of transformer 19 in FIG. 6……do | 0.387 |
| Distance of slot 34 from adjacent inside wall of transformer 19 in FIG. 7……do | 0.075 |
| Extreme width of iris 26……do | 0.500 |
| Narrow width of iris 26……do | 0.087 |
| Height of iris 26……do | 0.375 |
| Height of upper and lower H-bars of iris 26……do | 0.016 |
| Height of center H-bar of iris 26……do | 0.250 |
| Width of slot 30a……do | 0.165 |
| Depth of slot 30a……do | 0.690 |
| O.D. of window 31……do | 1.000 |
| Thickness of window 31……do | 0.060 |
| Glass of window 31, Corning | #7040 |
| Width of channel 26a……inch | 0.500 |
| Height of channel 26a……do | 1.120 |
| Width of channel 22a……do | 0.500 |
| Heighth of channel 22a……do | 1.120 |
| Inside dimension of coupling piece 63 in FIG. 6……do | 0.500 |
| Inside dimension of coupling piece 63 in FIG. 7……do | 0.750 |
| Distance between vanes 27 and 28 in FIG. 6……do | 0.087 |
| O.D. of opening in cup 29 for window 31……do | 0.750 |

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A synchronized, regenerative amplifier, comprising: an oscillator means for generating a relatively high-power, radio frequency signal; a loading means providing an output load for said oscillator means and so coupled to said oscillator means as to tend to maintain said oscillator means quiescent; a synchronizing generator means for providing a relatively low-power, synchronizing signal to enable said oscillator means to generate said high-power signal, frequency and phase locked to said synchronizing signal; and non-reciprocal, directional coupling means for coupling energy from said synchronizing means to said oscillator means and from said oscillator means to said loading means to translate substantially all of the energy from said synchronizing means only to said oscillator means and substantially all of the energy from said oscillator means only to said loading means, whereby, said oscillator means produces said high-power signal, frequency and phase locked to said synchronizing signal, at a substantially amplified power level to provide said synchronized, regenerative amplifier.

2. A synchronized, regenerative amplifier, comprising: a quiescent oscillator means for generating a relatively high-power, radio frequency signal; a loading means providing an output load for said oscillator means and so coupled to said oscillator means as to tend to maintain said oscillator means quiescent; a synchronizing generator means for providing a relatively low-power, synchronizing signal to enable said oscillator means to generate said high-power signal, frequency and phase locked to said synchronizing signal; and non-reciprocal, directional coupling means for coupling energy from said synchronizing means to said oscillator means and from said oscillator means to said loading means to translate substantially all of the energy from said synchronizing means only to said oscillator means and substantially all of the energy from said oscillator means only to said loading means, whereby, said oscillator means produces said high-power signal, frequency and phase locked to said synchronizing signal, at a substantially amplified power level to provide said synchronized, regenerative amplifier.

3. A synchronized, regenerative, magnetron amplifier, comprising: a quiescent, magnetron oscillator for generating a relatively high-power, radio frequency signal; a loading means providing an output load for said magnetron so coupled thereto as to end to maintain said magnetron oscillator quiescent; a synchronizing generator means for providing a relatively low-power, synchronizing signal to enable said magnetron oscillator to generate said high-power signal, frequency and phase locked to said synchronizing signal; and non-reciprocal, directional coupling means for coupling energy from said synchronizing means to said oscillator and from said oscillator to said loading means to translate substantially all of the energy from said synchronizing means only to said oscillator and substantially all of the energy from said oscillator only to said loading means, whereby, said oscillator produces said high-power signal, frequency and phase locked to said synchronizing signal, at a substantially amplified power level to provide said synchronized, regenerative, magnetron amplifier.

4. A synchronized, regenerative, klystron amplifier, comprising: a quiescent, klystron oscillator having a resonant cavity for generating a relatively high-power, radio frequency signal; a loading means providing an output load for said klystron oscillator means and so coupled to said cavity as to tend to maintain said oscillator quiescent; a synchronizing generator means for providing a relatively low-power, synchronizing signal to enable said oscillator to generate said high-power signal, frequency and phase locked to said synchronizing signal; and non-reciprocal, directional coupling means for coupling energy from said synchronizing means to said oscillator cavity and from said oscillator cavity to said loading means to translate substantially all of the energy from said synchronizing means only to said oscillator and substantially all of the energy from said oscillator only to said loading means, whereby, said oscillator produces said high-power signal, frequency and phase locked to said synchronizing signal, at a substantially amplified power level to provide said synchronized, regenerative, klystron amplifier.

5. A synchronized, regenerative, klystron amplifier, comprising: a quiescent, klystron oscillator having an input resonant cavity and an output resonant cavity regeneratively coupled together for generating a relatively high-power, radio frequency signal; a loading means providing an output load for said oscillator and so coupled to said output cavity as to tend to maintain said oscillator quiescent; a synchronizing generator means for providing a relatively low-power, synchronizing signal to enable said oscillator to generate said high-power signal, frequency and phase locked to said synchronizing signal; and non-reciprocal, directional coupling means for coupling energy from said synchronizing means to said output cavity and from said output cavity to said loading means to translate substantially all of the energy from said synchronizing means only to said oscillator and substantially all of the energy from said oscillator only to said loading means, whereby, said oscillator produces said high-power signal, frequency and phase locked to said synchronizing signal, at a substantially amplified power level to provide said synchronized, regenerative, klystron amplifier.

6. A synchronized, regenerative, magnetron amplifier, comprising: a quiescent, magnetron oscillator for generating a relatively high-power, radio frequency signal; a loading means providing an output load for said magnetron; an impedance transformer so coupling said oscillator to said loading means as to tend to maintain said oscillator quiescent; a synchronizing generator means for providing a relatively low-power, synchronizing signal to enable said magnetron oscillator to generate said high-power signal, frequency and phase locked to said synchronizing signal; and non-reciprocal, directional coupling means for coupling energy from said synchronizing means to said oscillator and from said oscillator to said loading means to translate substantially all of the energy from said synchronizing means only to said oscillator and substantially all of the energy from said oscillator only to said loading means, whereby, said oscillator produces said high-power signal, frequency and phase locked to said synchronizing signal, at a substantially amplified power level to provide said synchronized, regenerative, magnetron amplifier.

7. A synchronized, regenerative, magnetron amplifier, comprising: a quiescent, magnetron oscillator for generating a relatively high-power, radio frequency signal, said magnetron having a cylindrical cathode and an anode with a plurality of coupled, resonant cavities and an output iris coupled to said anode; a loading means providing an output load for said magnetron so coupled thereto as to tend to maintain said magnetron oscillator quiescent; a synchronizing generator means for providing a relatively low-power, synchronizing signal to enable said magnetron oscillator to generate said high-power signal, frequency and phase locked to said synchronizing signal; and non-reciprocal, directional coupling means for coupling energy from said synchronizing means to said iris and from said iris to said loading means to translate substantially all of the energy from said synchronizing means only to said oscillator and substantially all of the energy from said oscillator only to said loading means, whereby, said oscillator produces said high-power signal, frequency and phase locked to said synchronizing signal, at a substantially amplified power level to provide said synchronized, regenerative, magnetron amplifier.

8. A synchronized, regenerative, magnetron amplifier, comprising: a quiescent, magnetron oscillator for generating a relatively high-power, radio frequency signal, said magnetron having a cylindrical cathode and anode with a plurality of coupled, resonant cavities and an output iris coupled to said anode; a loading means providing an output load for said magnetron; a tapered, waveguide, impedance transformer coupled to said output iris to match the impedance of said load means to the characteristic impedance of said magnetron at said iris to tend to maintain said oscillator quiescent; a synchronizing generator means for providing a relatively low-power, synchronizing signal to enable said magnetron oscillator to generate said high-power signal, frequency and phase locked to said synchronizing signal; and non-reciprocal, directional coupling means for coupling energy from said synchronizing means to said transformer and from said transformer to said loading means to translate substantially all of the energy from said synchronizing means only to said oscillator and substantially all of the energy from said oscillator only to said loading means, whereby, said oscillator produces said high-power signal, frequency and phase locked to said synchronizing signal, at a substantially amplified power level to provide said synchronized, regenerative, magnetron amplifier.

9. A synchronized, regenerative amplifier, comprising: a quiescent oscillator means for generating a relatively high-power, radio frequency signal; a loading means providing an output load for said oscillator means and so coupled to said oscillator means as to tend to maintain said oscillator means quiescent; a synchronizing generator means for providing a relatively low-power, synchronizing signal to enable said oscillator means to generate said high-power signal, frequency and phase locked to said synchronizing signal; and a non-reciprocal, directional, ferrite, circulator coupling means for coupling energy from said synchronizing means to said oscillator means and from said oscillator means to said loading means to translate substantially all of the energy from said synchronizing means only to said oscillator means and substantially all of the energy from said oscillator means only to said loading means, whereby, said oscillator means produces said high-power signal, frequency and phase locked to said synchronizing signal, at a substantially amplified power level to provide said synchronized, regenerative amplifier.

10. A synchronized regenerative amplifier, comprising: a quiescent oscillator means for generating a relatively high-power, radio frequency signal; a loading means providing an output load for said oscillator means and so coupled to said oscillator means as to tend to maintain said oscillator means quiescent; a synchronizing generator means for providing a relatively low-power, synchronizing signal to enable said oscillator means to generate said high-power signal, frequency and phase locked to said synchronizing signal; and a ferromagnetic, non-reciprocal, directional coupling means having at least three terminals, each coupled to one of said oscillator means, said synchronizing means and said loading means, respectively, said directional coupling means having a transmission line section, a ferromagnetic medium disposed within said transmission line section and a unidirectional bias magnetic field axially directed through said ferromagnetic medium to provide a predetermined rotation of the plane of polarization of energy passing through said ferromagnetic medium for coupling energy from said synchronizing means to said oscillator means and from said oscillator means to said loading means to translate substantially all of the energy from said synchronizing means only to said oscillator means and substantially all of the energy from said oscillator means only to said loading means, whereby, said oscillator means produces said high-power signal, frequency and phase locked to said synchronizing signal, at a substantially amplified power level to provide said synchronized, regenerative amplifier.

11. A synchronized, regenerative, magnetron amplifier, comprising: a quiescent, magnetron oscillator for generating a relatively high-power, radio frequency signal, said magnetron having a cylindrical cathode and an anode with a plurality of coupled, resonant cavities strapped together and an output iris coupled to said anode; a loading means providing an output load for said magnetron; a tapered, waveguide, impedance transformer coupled to said output iris to match the impedance of said load means to the characteristic impedance of said magnetron at said iris to tend to maintain said oscillator quiescent; a synchronizing generator means for providing a relatively low-power, synchronizing signal to enable said magnetron oscillator to generate said high-power signal, frequency and phase locked to said synchronizing signal; and a ferromagnetic, non-reciprocal, directional coupling means having at least three terminals, each coupled to one of said oscillator means, said synchronizing means and said loading means, respectively, said directional coupling means having a transmission line section, a ferromagnetic medium disposed within said transmission line section and a unidirectional bias magnetic field axially directed through said ferromagnetic medium to provide a predetermined rotation of the plane of polarization of energy passing through said ferromagnetic medium for coupling energy from said synchronizing means to said transformer and from said transformer to said loading means to translate substantially all of the energy from said synchronizing means only to said oscillator and substantially all of the energy from said oscillator only to said loading means, whereby said oscillator produces said high-power signal, frequency and phase locked to said synchronizing signal, at a substantially amplified power level to provide said synchronized, regenerative, magnetron amplifier.

References Cited in the file of this patent

UNITED STATES PATENTS

| | | |
|---|---|---|
| 2,409,913 | Tonks | Oct. 22, 1946 |
| 2,523,841 | Nordsieck | Sept. 26, 1950 |
| 2,565,112 | Altar et al. | Aug. 21, 1951 |
| 2,730,621 | Hellings et al. | Jan. 10, 1956 |
| 2,748,352 | Miller | May 29, 1956 |
| 2,759,099 | Olive | Aug. 14, 1956 |
| 2,805,337 | Dunsmuir | Sept. 3, 1957 |